United States Patent [19]
Limberg

[11] 3,770,014
[45] Nov. 6, 1973

[54] UNIDIRECTIONAL VARIABLE FLOW VALVE

[75] Inventor: Donald R. Limberg, Wilmette, Ill.

[73] Assignee: The Metraflex Company, Chicago, Ill.

[22] Filed: Dec. 23, 1971

[21] Appl. No.: 211,588

[52] U.S. Cl............ 137/614.2, 137/613, 137/454.5, 251/118
[51] Int. Cl............................................ F16k 17/24
[58] Field of Search............ 137/614.2, 613, 614.17, 137/614.18, 454.5, 454.6; 251/118, 306

[56] References Cited
UNITED STATES PATENTS

| | | | |
|---|---|---|---|
| 3,306,316 | 2/1967 | Stillwagon | 137/613 X |
| 3,463,189 | 8/1969 | Fitzpatrick | 137/614.2 |
| 18,847 | 12/1857 | Hawkins et al. | 137/614.2 |
| 1,311,642 | 7/1919 | Deinert | 137/614.2 |
| 3,311,128 | 3/1967 | Taylor | 251/306 X |
| 3,420,498 | 7/1969 | Housworth | 251/306 X |
| 3,666,233 | 5/1972 | Scaramucci | 251/306 X |
| 3,667,726 | 6/1972 | Church et al. | 251/306 X |

Primary Examiner—Samuel Scott
Assistant Examiner—Ira S. Lazarus
Attorney—Carlton Hill et al.

[57] ABSTRACT

Unidirectional flow control valve and body in which the valve body has flanges at its opposite ends for connection in a pipeline, an inlet leading into the body through one flange, an aligned outlet leading from the body through the opposite flange, and a global flow expansion chamber between the flanges. A bronze insert in the inlet forms a guide and seat for a disk-type of check valve. A resilient insert in the outlet forms a seat for a butterfly type of flow control valve, the pivot of which extends diametrically through the resilient insert and flange in the valve body, and is so positioned that the butterfly valve when in a full open position may extend outside of the flange.

9 Claims, 3 Drawing Figures

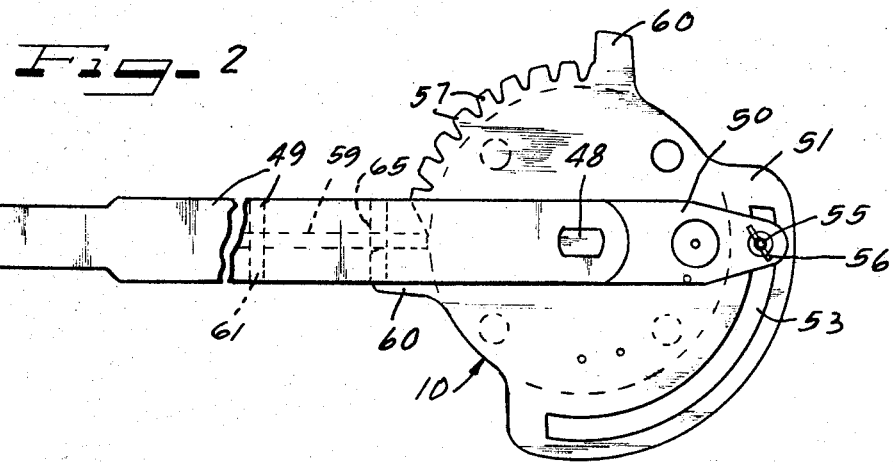
Fig. 2
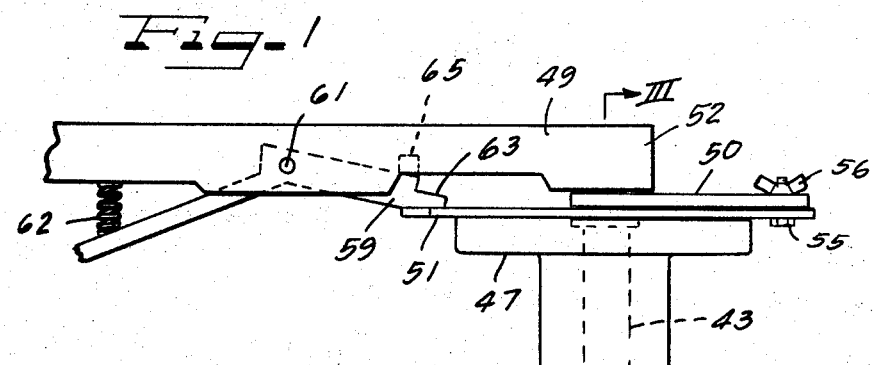
Fig. 1
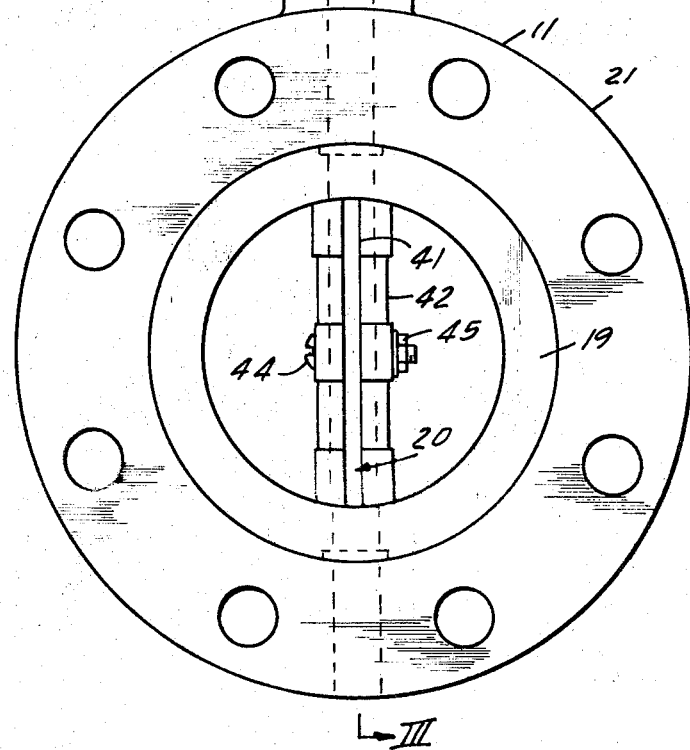

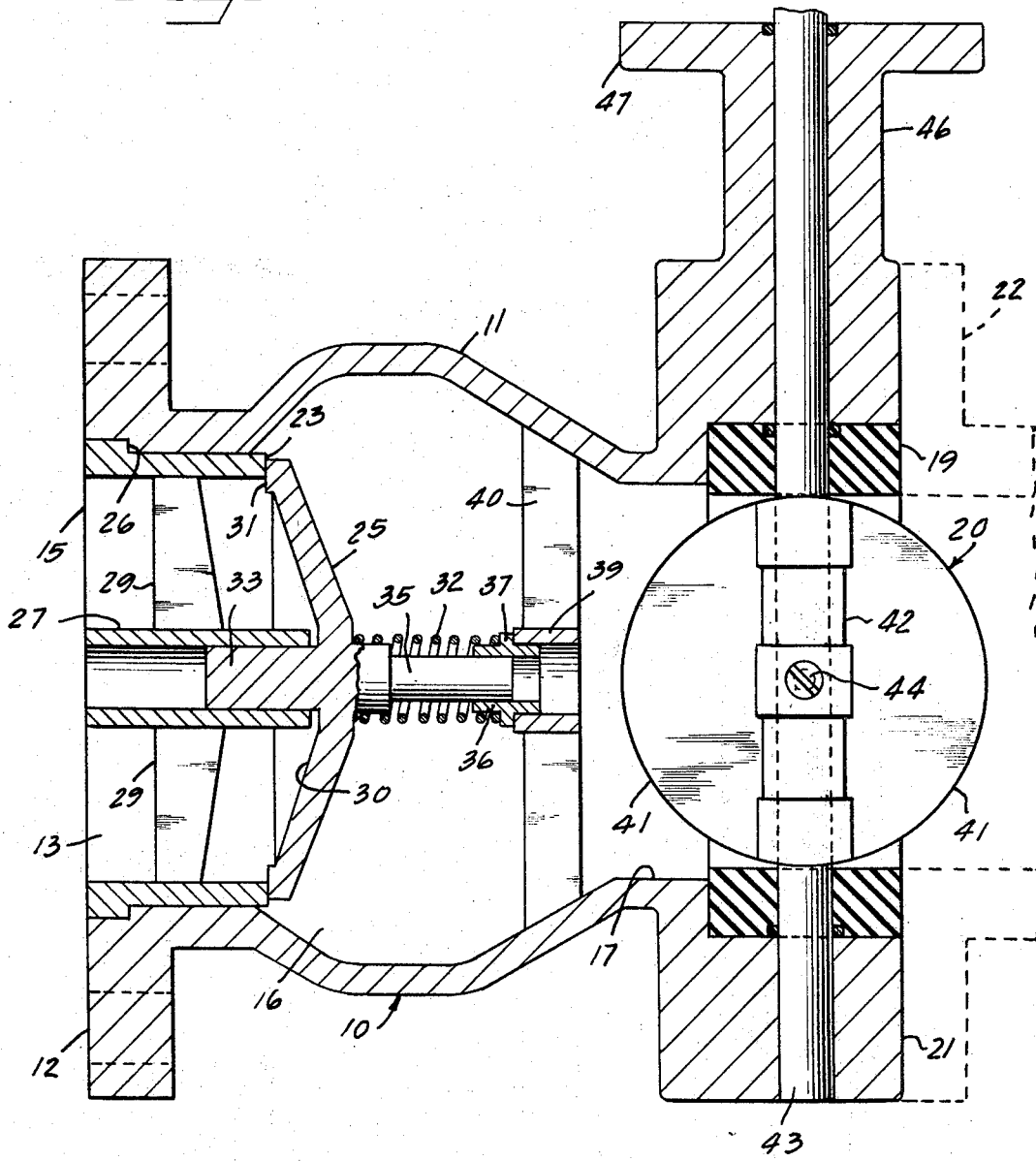

UNIDIRECTIONAL VARIABLE FLOW VALVE

FIELD OF THE INVENTION

Check and flow control valve body and valve of the type found in Class 251.

BACKGROUND AND OBJECTS OF THE INVENTION

Check and flow control valves have heretofore been provided in water and steam lines, as between a pump and a discharge header. These valves are usually contained in individual valve bodies connected in the discharge line and where they have been contained in a single valve body, they have been of a relatively complicated and expensive construction. The valve body has been difficult to cast and of necessity impedes the flow of water from the inlet to the outlet of the valve and the valve body. The valve parts also have required more space than is desirable, and are frequently subject to water hammer with a resultant high maintenance cost.

The valve body and valve of the present invention is an improvement on the prior art valves of the class described, in that a single in-line valve body having an inlet at one end of the valve body and an aligned outlet at the opposite end of the valve body contains a check valve in cooperation with the inlet and a butterfly type of valve in cooperation with the outlet with a global chamber between the valves accommodating a low pressure loss with maximum efficiency of the valve. The valve body is so constructed that its opposite ends are flanged for connection in a pipeline, and conserves in length of the valve body by utilizing a disk-type check valve and a butterfly type of flow control valve placed in the outlet from the valve body to extend outwardly of the valve body into a next adjacent fitting or pipe when the valve is in its full open position.

The advantages of the present invention, therefore, are that a relatively short single in-line valve body of a simplified construction may form a body for a check and in-line flow control valve.

Another advantage of the invention is the provision of a unidirectional flow control valve and valve body of a more compact and economical construction than has heretofore been considered possible.

A further advantage of the invention is that the valve body is so formed as to accommodate a disk-type check valve in the inlet and a butterfly type of flow control valve in the outlet and extending outwardly of the body into a next adjacent pipe or header with an expansion chamber between the valves in which the cooperating valve assemblies are so arranged that the entire valve body is no longer than that usually required for a conventional disk-type check valve.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is an end view of a combined flow control and check valve constructed in accordance with the principles of the present invention looking at the valve and body from the flow control end thereof.

FIG. 2 is a fragmentary plan view of the valve shown in FIG. 1 with certain parts broken away and illustrating the control for the flow control valve; and FIG 3 is a sectional view taken substantially along line III—III of FIG. 1.

DESCRIPTION OF PREFERRED EMBODIMENT OF INVENTION

In the embodiment of the invention illustrated in the drawings, I have shown in FIGS. 1 and 3 a unidirectional flow control valve 10 constructed in accordance with the principles of the present invention and including a unitary valve body 11 having a flange 12 at the inlet end thereof, and a flange 21 at the outlet end thereof. The flange 12 has an inlet 13 leading therethrough, shown as being in the form of an insert 15 fitted into said valve body, as will hereinafter be more clearly described as this specification proceeds. The inlet 13 terminates into a global valve chamber 16 converging at its downstream end into an outlet 17 having a resilient valve seat 19 recessed therein and forming a seat for a butterfly type of flow control valve 20. The outlet 17 is axially aligned with the inlet 13 and leads through a flange 21, adapted to be connected to a flanged discharge pipe 22, in a conventional manner, and shown in phantom in FIG. 3.

The flanges 12 and 21 are drilled to accommodate the sealing and bolting of the valve body to flanged inlet and discharge pipes in a manner which is conventional in large volume fluid flow pipelines.

The insert 15 may be made from bronze or a like material, and has a downstream face 23 forming an annular seat for a check valve 25, shown as being a disk-type of check valve. As shown in FIG. 3 the insert 15 is shouldered as indicated by reference numeral 26 and engages a similar shouldered portion in the valve body and may have a light press fit with said valve body. A screw or threaded connection may also retain said insert to said valve body.

A cylindrical guide 27, which may also be made from brass extends along the center of the insert 15 and is supported in said insert as by a plurality of radial arms 29 extending from the inner wall of said insert to said cylindrical guide. The guide 27 and arms 29 may be formed integrally with said insert, or may be suitably secured thereto.

The check valve 25 is shown as being a disk-type of check valve, having an inwardly dished upstream surface 30 and a valve element 31 extending about said dished upstream surface. The valve 25 may be made from bronze or a like material and the valve element may be lapped to the valve seat 23, to provide positive closing of the valve by a compression spring 32, which may be made from stainless steel. A guide member 33 extends axially of the valve 25 in an upstream direction along the center thereof and is slidably guided in the guide 27. A stepped guide member 35 coaxial with the guide member 33 extends in a downstream direction and is slightly guided in a bushing 36 having a radial flange 37 intermediate its ends forming a seat for the spring 32. The bushing 36 in turn is carried in a hub 39 of a spider 40 extending across and radially of the global valve chamber 16.

It may be seen from the foregoing that upon a positive differential head pressure at the upstream side of the check valve, the valve 25 will be forced open against the spring 32 and the guides 33 and 35 are of sufficient length to accommodate opening of the check valve to a full open position for maximum pressure and flow conditions. As the pressure differential across the check vavle approaches zero, the spring 32 will move the check valve in a direction to seat the valve on the valve seat 23, and thus prevent the backflow of fluid through the inlet.

The butterfly valve 20 is shown in FIGS. 1 and 3 as being in the form of two substantially semicircular disks joined together by a hollow connector 42 connecting the disks to form a true circle, seating on the cylindrical face of the resilient valve seat 19. A shaft 43 passes radially through the flanged portion 21 of the valve body and diametrically through the outlet and connector 42 to pivotally mount said valve in said outlet. A bolt or machine screw 44 extends through the connector 42 and shaft 43 and has a nut 45 threaded thereon and tightened to retain the butterfly valve to rotate with the shaft 43. Turning movement of the shaft 43 may thus turn the valve 20 from a shut-off position, with its circumferential face engaging the interior cylindrical wall of the valve seat 19 and into a full flow position extending at 90° with respect to its shut-off posiiton.

An operating end of the shaft 43 extends through the flange 21 and along a boss 46, extending radially of said flange, through a flanged portion 47 of said boss to the outside of said boss. The outer end of said shaft has a non-circular outer end portion 48, forming a mounting for a hand lever 49 for turning the valve between its open and closed positions. A clamping arm 50 extends radially of the shaft 43 and hand lever 49, over an indexing plate 51, and is held to turn with said shaft as by the non-circular end portion 48 thereof and a hub 52 of the hand lever 49. The clamping lever 50 extends over a slot 53 shown as being formed in the plate 51 in the quadrant of a circle, and has a clamping screw 55 extending therethrough and through the slot 53. A wing nut 56 threaded on the screw 55 may be tightened to clamp said clamping arm and the hand lever 49 and shaft 43 in a fixed position relative to the slot 53.

A plurality of equally spaced indexing teeth 57 are shown as diametrically opposed to the slot 53 and cooperate with an indexing lever 59 on the hand lever 49 to indicate the position of said hand lever 49, and to thereby index the position of the butterfly valve 20. Stops 60,60 are provided at opposite ends of the indexing teeth 57 and are adapted to be engaged by the indexing lever 59 to prevent turning of the butterfly valve beyond its full open and closed positions.

The portion of the hand lever 49 extending outwardly of the hub 52 is generally U-shaped in cross section with the base of the U extending along the top of said hand lever. The indexing lever 59 is pivoted intermediate its ends between the legs of the U-shaped portion of the hand lever 49 on a transverse pivot pin 61. The outer end of the hand lever 49 has a compression spring 62 seated thereon between the legs of the U-shaped portion of said hand lever. The spring 62 biases a reduced height pawl-like end portion 63 of the indexing lever 59 in position to engage either of the stops 60 or the space between any two indexing teeth 57.

Thus, when it is desired to move the butterfly valve between its fully open position shown in FIGS. 1 and 3, to its closed position, it is merely necessary to squeeze on the end of the indexing lever 59 against the spring 62 to release the indexing end of said lever from the teeth 57 and turn the hand lever 49 in a clockwise direction ninety degrees. Upon release of the indexing lever, assuming the wing nut 56 has been loosened, the spring 62 will bias the lever into engagement with a stop bar 65 extending across the hand lever 49 between the legs of the U-shaped portion thereof and retain the pawl-like end 63 of said lever into position between two indexing teeth 57 of the plate 51. The stops 60,60, however, extend far enough out in a radial direction to prevent overtravel of the lever 49 in either direction.

The valve body 11 when connected in a pipeline through its flanges, and having the check and butterfly valve mounted therein, is thus effective as a unidirectional flow valve body, in which the volume of fluid passing through the valve body may be regulated by the butterfly valve 20, and the two valves cooperate with the global chamber of the valve to provide a larger than pipe size flow area to accommodate low pressure loss with maximum efficiency. The valve body further has sufficient length to accommodate the full opening of the check valve and supports the butterfly valve to extend diametrically outside of the flange 21 when in its full open position, to provide the shortest possible dimensions between the outer faces of the flanges 12 and 21.

I claim as my invention:
1. In a unidirectional variable flow control valve,
   a valve body having attachment flanges at opposite ends thereof,
   an inlet into said valve body through one of said flanges,
   an annular insert fitting into said valve body at the inlet end thereof and having an inner cylindrical wall defining said inlet and having a valve seat at its downstream end,
   an outlet from said valve body through the other of said flanges,
   a global chamber between said inlet and said outlet accommodating low pressure loss without impairing the efficiency of the valve,
   said outlet having a resilient valve seat recessed therein and forming a flow control valve seat,
   a check valve having an annular valve face cooperating with and biased into engagement with said valve seat at the downstream end of said insert,
   a cylindrical guide for said check valve extending axially along the center of said insert,
   radial arms extending inwardly of said insert and forming a mounting for said cylindrical guide, and
   means spaced downstream of said check valve and cooperating therewith to regulate the flow of fluid from said outlet comprising a butterfly valve having cooperative engagement with said resilient valve seat.

2. The unidirectional flow control valve of claim 1, including
   a spider extending across said global valve chamber downstream of said check valve,
   a cylindrical guide bushing for said check valve carried by said spider in axial alignment with said cylindrical guide in said inlet, and
   a spring seated on said bushing and biasing said check valve into a closed position.

3. The unidirectional flow control valve of claim 2, wherein the check valve is of a disk-like form having an inwardly dished upstream face encircled by said annular valve face, wherein the check valve has an integrally formed guide member extending in an upstream direction from said dished face and having slidable guiding engagement with said cylindrical guide carried by said insert, and has an integrally formed guide member extending in the downstream direction in axial alignment with said first mentioned guide member and slidably guided in said bushing carried by said spider.

4. The unidirectional flow control valve of claim 1, wherein a shaft extends diametrically of said valve body through said flange, at the outlet end of said valve body, wherein the butterfly valve is carried by said shaft and is pivotally moved between its closed and its flow control positions by turning movement of said shaft, and wherein the location of said shaft with respect to the upstream face of said flange is such as to position said butterfly valve to extend beyond the upstream face of said flange when said valve is in the full open position.

5. The unidirectional flow control valve of claim 4, including a handle on the outer end of said shaft, means connecting said handle to said valve for turning said valve into its flow control and closed positions, and detent means for indexing said handle and valve into its several selected operative positions.

6. The unidirectional flow control valve of claim 3, wherein said spider is disposed between said check valve and said butterfly valve distances sufficient to accommodate full opening of said check valve against said spring means, and to accommodate movement of said butterfly valve from a closed position extending across said resilient valve seat and outlet to a full open position extending in a plane parallel to the axial center of said valve seat and check valve.

7. The unidirectional flow control valve of claim 6, wherein said insert, cylindrical guide, guide bushing and check valve are made from bronze, said valve body is cast steel and said resilient insert and valve seat in said outlet are made from a rubber-like material.

8. The unidirectional flow control valve of claim 3, including a shaft extending diametrically of said valve body through said flange at the outlet end of said valve body, wherein the butterfly valve is carried by said shaft and pivotally moved between its closed and its flow control positions by turing movement of said shaft, wherein the location of said shaft with respect to the upstream face of said flange is such as to position said butterfly valve to extend beyond the upstream face of said flange, when said valve is in its full open position.

9. The unidirectional flow control valve of claim 8, wherein said spider is disposed between said check valve and said butterfly valve distances sufficient to accommodate full opening of said check valve against said spring means, and to accommodate movement of said butterfly valve from a closed position extending across said resilient valve seat to a wide open position extending outwardly of the outlet end of said valve body.

* * * * *